United States Patent Office 3,211,581
Patented Oct. 12, 1965

3,211,581
CONSTRUCTION BLOCK OF COMPRESSED SALTS ENCAPSULATED WITH EPOXY RESIN
William John Van Schelven, 6056 20th St. N., Arlington County, Va.
No Drawing. Filed July 31, 1962, Ser. No. 213,602
1 Claim. (Cl. 117—161)

This invention relates generally to the novel improvement in the composition of salts by waterproofing, and more specifically to the provision of waterproofed compressed blocks of salts of various shapes and sizes useful for many inedible purposes.

Previous to this invention, the compression of salts into blocks has been described as of use solely for edible purposes by livestock (which purposes do not require a waterproofed coating which contrariwise would actually inhibit the intended use), and may be manufactured by any of many salt presses designed to compress loose salts into blocks of varying density, shapes and sizes.

An object of this invention is to provide uses for the inedible and non-chemically pure salts and other residual materials resulting from the evaporation of seawater and many other saline and mineral waters, as well as from natural deposits of such materials whenever found, through the improvement in the composition of salts by waterproofing.

Another object of this invention is to improve the composition of salt blocks through methods that yield a waterproofed coating in such manner that they may be used for many low-cost, low-tensile-strength-requirement building situations which do not require earthquake-proofing, hurricane-proofing, proven capabilities of absolute shielding from nuclear fission effects or long warranties of duration but which can use a relatively fireproof as well as termite and other insect-proof material as well as providing a surface for such salt blocks that will permit a relatively easy bonding of the blocks.

The above objects as well as other objects and advantages will become apparent from the following specification. Also apparent in the specification will be many building situations in which this invention will be of material aid.

In order that the full import of this improvement may be appreciated, it is well to note that the problem of developing new uses for huge additional production of a product such as salt already in plentiful supply, although inequitably distributed in land deposits, is considerably different from the problem of advancing the art of current usages. This is even more especially true when the very nature of the physical and chemical properties of the product present problems in its contemplated new uses and the product is quite low in present economic value for its current usages. The desalination of saline water by a saline water conversion technique results in the production, as a by-product, of tremendous quantities of saline water conversion residual solids. The proper disposal of this by-product represents a problem of major magnitude; and, in practice, the problem has not been adequately solved, whereby the residual solids have constantly accumulated in ever greater quantities and constitute an ever increasing pollution hazard. Certain suggestions made heretofore for the disposal of such residual solids include return to the sea thereby severely limiting the area potential of the saline water conversion program; or require injection into the ground or into abandoned oil wells, again severely limiting the area potential; or require a river which floods periodically, again limiting the area potential; or envision a land dump of some kind. The land dump processes require expensive pipelines or canals in which untreated soils may flocculate and permit the contamination with salt of the surrounding soil; another process requires freighting; and still another contemplates that the residue be solar evaporated to dryness and abandoned in situ at the plant site. If such lamp dump disposal is to be done generally, it requires abandoning large acreages forever and also requires construction and maintaining forever tight structures to hold the salts. These structures turn out to be the major cost and place abandonment among the high cost processes.

The saline water conversion plant in the Virgin Islands may be considered for illustrative purposes. This plant processes in the neighborhood of 550,000 gallons of seawater per day with a resulting fresh water product of approximately 265,000 gallons per day and a plant effluent of approxiately 288,000 gallons per day or a deduction of 43% of fresh water from the original volume. The salinity of the 57% effluent has been raised from the original content of 40,000 p.p.m. in seawater in that area to 70,000 p.p.m. Since the first salts precipitate on evaporation to about 53% of original volume, the effluent is still highly mobile.

The effluent could be contained in an area of a little less than one acre foot per day, and to provide storage of brine for a year's time would require the equivalent of approximately a half square mile of surface since there is no purpose served in providing deep storage of brine intended for conversion into dry materials through solar evaporation.

The dried salts from this effluent could be contained as compressed salt blocks within an area of 1612 cubic feet (about $\frac{1}{27}$ of an acre foot) per day, and a year's production of salts can be contained within an area of 588,380 cubic feet (about 13½ acre feet) or would build a house a day from its 3200 fifty-pound blocks which would be enough to house a one-third of one percent increase population which consumes water at the rate of 200 gallons per person per day.

When salt is compressed into blocks and waterproofed, it automatically furnishes the construction material for salt containment and materially reduces the area required, regardless of whether an end usage for salt blocks is anticipated in that particular area.

Moreover, when salt is compressed into blocks and waterproofed, it automatically prevents contamination, eliminates perpetual care and would build up a reserve of man-made-rock-salt mines above the surface.

It must be understood that the term "salt block" or "block of salt" (both terms used interchangeably) can incorporate a variety of formulas or mixtures of common salt with other minerals and that the contents of salts intended for inedible purposes do not require chemically pure components and are not regulated by Federal or State governments unless used for road-base stabilization and snow and ice removal from highways.

It must be further understood that the composition and density of a salt block can be varied to suit different conditions and product requirements without adversely affecting the protection against water which is added to the salt block by this invention.

It must be further understood that recent chemical advances are almost in the nature of an "explosion of advances" and weekly provide many additional compounds which are capable of performing the waterproofing required by my invention.

The major problem remaining is merely to select from a large variety of compounds those which are capable of performing a particular job and the matter of competition in costs of compounds. This will probably prove a continuing situation for some time to come.

It is intended that within the scope of my invention, and without departing from the spirit and principles involved and without sacrificing its chief advantages, that those skilled in the art or those who may become learned by practice with my invention may propose, or resort to methods other than those herein disclosed with regard to numerous variations, modifications, different arrangements and changes in the form and proportion or in the details of construction or in the sequence of steps, in the composition or combinations of materials or may claim improvements pointed out in the background material included in this application. Therefore, my invention in its broader aspects is not limited to the specific steps described below, but departure may be made therefrom and any other method of obtaining the end product is equally applicable to this invention. Further, it is not desired to limit this invention to the exact construction and operation described below, and accordingly, all suitable modifications and equivalents may be resorted to as falling within the scope of my invention. Further, while the invention is below described with a certain degree of particularity, it is understood that this disclosure is made by way of example and to teach those who would become learned in the art by practice with my invention.

To more fully illustrate and disclose my new composition, specific illustrative but non-limitative examples will now be provided. Since the arts of extraction of residues of saline waters and the mining of natural deposits of salts as well as the compression of these materials into blocks is well known, it will be assumed that those who would become learned in the art will have become familiar with this application of the art before they attempt practice of my invention. Therefore the first example will be one so simple that any practitioner may demonstrate the method using only the tools available to almost any household:

*Example 1.—A temporary waterproofing process*

Obtain a salt block from any commercial source (almost any dairy feed store can supply various types of blocks) and saw block (using an ordinary hand saw), into any convenient size for the purpose of demonstration. Obtain a supply of ordinary paraffin (almost any grocery store can supply this item). Using a double boiler effect, heat two containers of paraffin, one to about ten degrees above melting temperature and the other to near the temperature of boiling water. Dip the sample of salt block first into the higher temperature paraffin which serves the dual purpose of raising the temperature of the sample of salt block and of providing a thin film of filler on the surface on the sample of salt block. Remove from the higher temperature paraffin and immerse in the lower temperature paraffin. This second immersion at a lower temperature will provide a temporary waterproof coating and the sample of salt block may be withdrawn and inserted into cool water, wherein it may stay for varying periods in a waterproofed condition depending upon the thickness of the paraffin coating. If this sample is withdrawn from water and stored under normal conditions without being subjected to rough handling or atmospheric extremes (such as freezing, 100% humidity or temperatures above the melting point of paraffin), the waterproofed coating will last indefinitely.

*Example 2.—Waterproofing of individual grains of salt, both with and without additives*

It is the inventor's belief, referring to the waterproofing of individual grains of salt before compression into a salt block so that any cutting into the surface of the waterproofed coating of a salt block would not require re-water-proofing, that these are two separate processes which are quite different in nature in that a salt block is obtained by compression of crushed and finely powdered grains of salts in which adherence of the powdered product under compression results in a different product from individual grains, i.e., should waterproofed individual grains of salts be crushed and finely powdered, there no longer exists the individual grains of salts. When adherence does occur, it is probable that this adherence is more due to a bonding action exerted by the waterproofing agent, increased by compression. Nevertheless, a simple example will be given:

Into a cup of heated and melted paraffin (brought to near the boiling point of water), stir in ordinary table salt until the mixture is so heavy that stirring is no longer practical. On cooling, this block may be cut in half, and immersed in water with no appreciable loss of salt except where the block has been cut. Density may be increased through compression but it is believed that the paraffin acts as the bonding agent. A harder, tougher and more dense product may be obtained by including varying amounts of calcium carbonate into the mixture.

*Example 3.—A permanent waterproofing process*

A preferred embodiment of my invention is obtained by the use of waterproofing coatings in the family of epoxy resins, both powders and solutions. The inventor frankly favors the epoxy coating described in U.S. Patent 3,021,234 granted on Feb. 13, 1962, to Casement and Hinkley and assigned to the Minnesota Mining and Manufacturing Company. This embodiment can be incorporated as an accessory to a hydraulic press producing compressed salt blocks with the rate of material producting satisfactorily integrated. Once again, the inventor has a favorite, namely, the "H-P-M Fastraverse" hydraulic press which has a capacity of 275 fifty-pound blocks of salt per hour or a 17% greater capacity in salt block manufacturing than a million gallons per day saline water conversion plant has in producing the basic salt. There are two other requirements for an integrated automatic processing assembly line. The first is a roller device which in removing the salt blocks from the hydraulic press will convey them into a dipping vat into which the epoxy composition is poured as required and maintained at a level which satisfactorily coats each block, and thence through an oven (similar to a continuous bread baking oven) for curing over a two hour period at a temperature of approximately 150–350 degrees Fahrenheit. After cooling to a temperature permitting easy handling, the blocks are ready to be used for any purpose. Any surplus heat from the baking process will be usable in the production of salts. The closest developed technical description of this process would be called "encapsulation with adhesion."

In addition to its waterproof qualities, the end product will be termite and other insect proofed. It will be relatively fireproof since salt has a melting point of 804 degrees centigrade, or greater than its waterproof covering. A salt block which is in the size of an ordinary clay brick or larger cannot be broken in the hands of an ordinary man nor can he detach with a finger an edge or a corner. The material has a hardnes of 2½ and may be sawn into a variety of shapes by ordinary household tools with the understanding that each time a waterproofed surface is cut that a new application of waterproofing material is required if that quality is to be maintained.

Under great pressure, rock salt (therefore, salt block) is plastic and will flow slowly as a viscous fluid. The ability of rock salt to flow under pressure enables it to seal cracks and fissures in the surrounding rock, helping to keep the interior of salt mines dry.

Pure salt may range from white to gray and in block form will have a marble-like appearance and feeling with a vitreous luster and depending upon thickness may be transparent or translucent. When various minerals are added to pure salt or are permitted to remain in residues from sea-water or other saline waters, various colors will be produced. Salt is highly diathermic and while conductive of electricity in solution is a non-conductor in a dry state.

It will be apparent from the foregoing that a method has been provided which is very effective in waterproof-coating either the individual grains of salts (and other materials resulting from evaporation of saline waters) or compressed blocks of salts (which may include other materials resulting from the evaporation of saline waters either by man or by nature); with said method resulting in the production of a new and highly useful end product.

It will also be apparent that I have devised a simple method and one which may be carried out very economically from a commercial standpoint; a process relatively inexpensive to install and use and one which requires equipment and area of minimum size with small capital investment which is satisfactorily operable at rates integrated with the rate of material production, thus enabling the invention to be incorporated as an accessory to the production plant with optimum results.

It will also be apparent that I have provided an extremely simple but highly efficient improvement in the composition of salts by waterproofing which attains the objects previously recited.

It is believed that the nature and advantages of my invention have been made fully apparent from the foregoing.

Having thus described by invention, I claim:

A construction block comprising an inedible mass of compressed saline water conversion residual solids consisting essentially of chemically impure salt, the individual grains of which are crushed into a fine powder in said block by compression, and a continuous substantially permanent coating of waterproofing material completely encapsulating the said compressed mass, said coating comprising a continuous layer of epoxy resin in intimate adherent contact with at least all exterior surface portions of said mass.

References Cited by the Examiner
UNITED STATES PATENTS

| | | | |
|---|---|---|---|
| 1,433,088 | 10/22 | Mock | 117—168 |
| 1,912,697 | 6/33 | Fife | 117—100 |
| 2,162,690 | 6/39 | Anderson | 117—100 X |
| 2,658,476 | 11/53 | Futter | 119—51 |
| 2,785,383 | 3/57 | Foster | 117—161 X |
| 2,881,090 | 4/59 | Reidl | 117—161 X |
| 3,009,775 | 11/61 | Ladenburg et al. | 117—100 X |
| 3,021,234 | 2/62 | Casement et al. | 117—161 |
| 3,071,457 | 1/63 | Murray | 23—42 |

OTHER REFERENCES

Time, News in Pictures, Apr. 21, 1952, back of page 27.
Skeist, Epoxy Resins, 1958, pp. 240 and 241.

WILLIAM D. MARTIN, *Primary Examiner.*